2,749,833

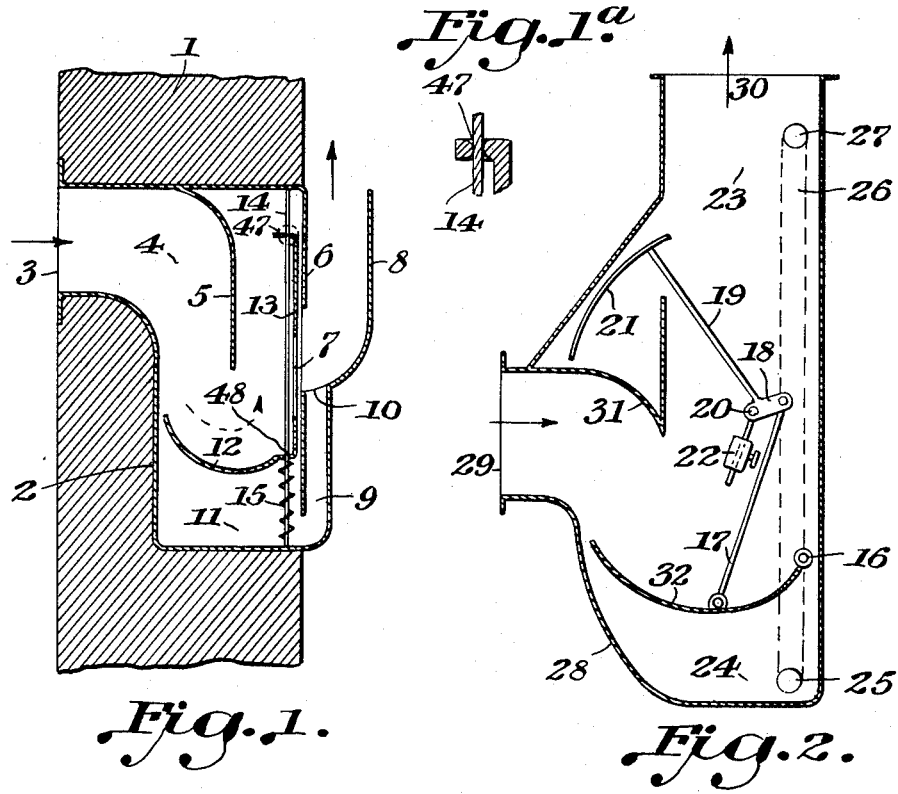
Fig. 1ᵃ
Fig. 1.
Fig. 2.
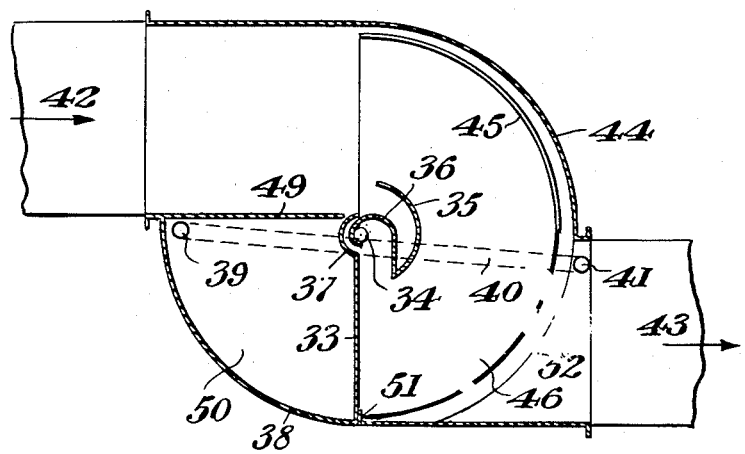
Fig. 3.
JOHANNES P. HEKELAAR
INVENTOR.
BY Wenderoth, Lind & Ponack
ATTYS.

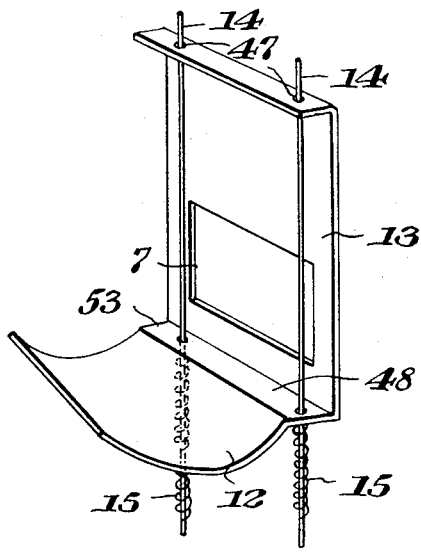
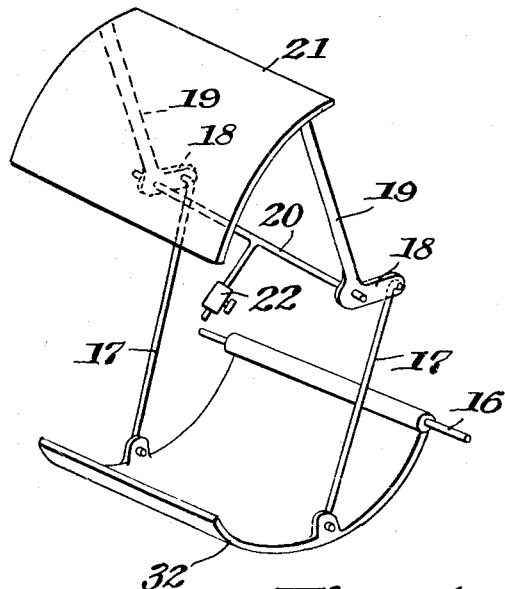
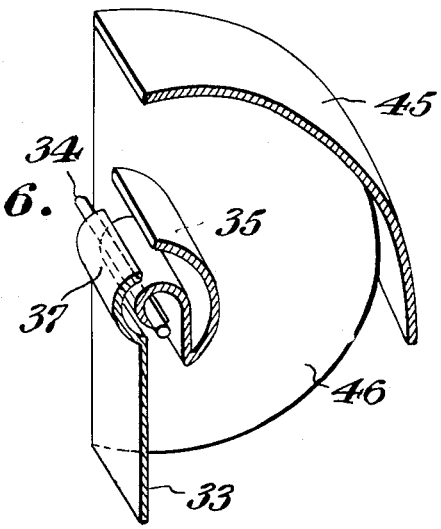
JOHANNES P. HEKELAAR
INVENTOR.
BY Wenderoth, Lind and Ponack
ATTYS United States Patent Office 2,749,833
Patented June 12, 1956

AUTOMATICALLY CONTROLLED VENTILATION DEVICE

Johannes Petrus Hekelaar, The Hague, Netherlands, assignor to Eugene Josef Marie van de Pol, The Hague, Netherlands Application April 13, 1953, Serial No. 348,237

Claims priority, application Netherlands April 21, 1952

8 Claims. (Cl. 98—95)

My invention relates to an automatically controlled ventilation device.

It is known to ventilate rooms and other closed spaces by means of ventilation orifices provided in external walls, sometimes provided with a shutter adjustable by hand. This method had however the disadvantage that the degree of ventilation is strongly dependent on the momentary force and direction of the wind, so that strong winds perpendicular to a ventilation orifice will cause unpleasant draughts.

To obviate this it has been suggested to provide a rectangular ventilation orifice with a set of superposed, pivotally supported vanes, somewhat saddle-like in shape. The wind pressure acting on these vanes moves them out of the position they have at rest, reducing the available air-passage and controlling thereby the admission of ventilation air. In practice, however, this device shows some disadvantages. Under the action of a given pressure the vanes will not take a definite position, but will start oscillating about this position with increasing amplitudes, especially so if they are submitted to a wind of some strength. But even when no oscillations are originated, another phenomenon may occur, putting out of the question a positive control of the air flow through the device. At a given force of the wind the vanes can namely occupy not one definite position but two different ones, dependent on whether the vanes reach the equilibrium position through an increase or a decrease of the force of the wind. Yet another disadvantage is that the vanes during their oscillations will come into contact with each other, producing thereby an objectionable rattling noise.

Extensive experiments of the applicant with various ventilation devices based on the above principle have shown that the disadvantages described are caused by air vortexes produced between and immediately behind the vanes, said vortexes causing strong variations of the air pressure acting on the vanes. The combined action of aerodynamic forces and of inertia resistance may also cause the vanes to oscillate when a sudden change of air pressure moves them rapidly from one position into another. The phenomena described were found to be inherent to systems wherein the part which reacts to the wind pressure acting thereon by carrying out a movement substantially in or against the direction of said pressure, has also the task of modifying the available air passage.

The object of my invention is to provide an automatically controlled ventilation device not suffering from the disadvantages set out above.

Another object of my invention is to provide an automatically controlled ventilation device which is not only suitable for ventilation of buildings, but also of railway carriages, motor-cars etc.

Yet another object of my invention is to provide an automatically controlled ventilation device, which above a certain minimum wind pressure, will maintain a substantially constant ventilation rate between wide limits of wind pressure.

The device according to my invention comprises a casing provided with an air inlet and an air outlet, a slide valve mechanism, movable in said casing in a direction substantially perpendicular to the direction of the wind pressure acting on said slide valve mechanism, to vary the outlet area; like vane devices movable under the action of wind pressure and connected with said valve mechanisms tending to move them under the influence of said pressure into the "closed" position, with a force increasing with said pressure; and means tending to move said valve mechanisms into the "open" position with a force increasing with the distance of said valve mechanisms from said "open" position. Under the influence of these two opposite forces the slide valve mechanisms will, above a certain minimum wind pressure, take a position restricting the air outlet area, and this position will vary dependent on wind pressure so as to maintain a substantially constant ventilation rate within a wide range of wind pressures.

The movement of the slide valve mechanisms being according to my present invention substantially perpendicular to the forces exerted on said valves by the air flowing past them, it will be obvious that said valve mechanisms will be insensible to the action of the wind pressure, vortexes etc. On the other side, the vane like devices reacting to the pressure of the wind can easily be shaped so as not to cause vortexes which might endanger the stability of said devices and can easily be located where such vortexes do not occur.

My invention will be further explained and described with reference to several embodiments shown in the accompanying drawings, wherein:

Fig. 1 shows a vertical section of a device according to the invention positioned in an exterior wall of a building;

Fig. 1a is an enlarged sectional view of the hole 47 and wire 14 as shown in Fig. 1;

Fig. 2 is a similar section of a different embodiment of the invention;

Fig. 3 is a cross sectional view of a third embodiment of the invention, particularly suitable for use in motor cars and other vehicles;

Fig. 4 is a perspective view of the movable parts of Fig. 2;

Fig. 5 is a perspective view of the movable parts of Fig. 1, and

Fig. 6 is a perspective view, particularly in section, of the movable parts of Fig. 3.

In Fig. 1, reference numeral 1 represents an exterior wall of a building provided with a ventilation device according to my invention. The air flows through the inlet orifice 3 into the duct 4 provided in the casing 2 and is directed by the guide vane 5 against the vane 12, this latter causing the air stream to reverse its direction as indicated by the broken arrow. The air stream exerts on vane 12 a force in downward direction whose magnitude depends on the strength of the wind. This vane is fixed by a connecting piece 53 to a slide valve 13 slidably mounted in the casing in the immediate proximity of wall 6 of said casing, so that a downward displacement of slide valve 13 will reduce the available area of the outlet orifice 7 provided in said wall. The air will flow through this orifice into the duct 8 and hence into the room to be ventilated.

The vane 12 and the slide valve 13 connected therewith are guided by two taut metal wires 14, passing through the holes 47 in the bent over top of slide valve 13 and aligned holes 48 in connecting piece 53. An enlarged section of hole 47 and wire 14 is illustrated in Fig. 1a. Helical springs 15 around the wire 14 exert a force in upward direction on vane 12. An increase of wind pressure will displace vane 12 in downward direction until a position is reached in which the increased spring reaction will counterbalance the wind pressure, thereby restoring the equilibrium. Now, a downward displacement of vane 12 will cause a similar displacement of slide valve 13 connected with vane 12, reducing thereby the area of the air passage 7. Thus, above a certain minimum wind pressure on vane 12 (to which must be added the weight of vane 12 and of slide valve 13), which minimum depends obviously on the initial tension given to the springs 15 the area of the air passage will decrease when the wind pressure increases and vice versa. An appropriate choice of the springs 15 as well as of the shape and size of the orifice 7 will allow to achieve any desired relation between the wind pressure and the ventilation rate, e. g. to make this rate substantially independent of said pressure between wide limits.

To reduce as much as possible frictional resistance to vane movements, a small clearance must be provided between vane 12 and the casing. This clearance, however, provides a connection between space 11 below vane 12 and the space above said vane. To avoid too great a pressure building up in space 11, which would reduce or even annihilate the effect of the downward pressure of the wind on vane 12, this space is vented by means of a duct 9 which debouches as shown by the reference numeral 10 behind the orifice 7 into the air duct 8. The relatively small quantity of air penetrating into the space 11 through the little holes 48 and the clearance between the vane and the casing will be discharged through the ducts 9 and 8 and will cause but a small back pressure on vane 12. Where hereinbefore and hereinafter reference is made to wind pressure acting on the vane, it is to be understood that by this expression is meant the effective wind pressure, i. e. the wind pressure minus the back pressure.

Figure 2 shows another embodiment of my invention. Herein the casing 28 is provided with an intake orifice 29 and an outlet 30. The air penetrating into the casing is deflected by the guide vane 31 towards the vane 32, which latter is pivotally mounted in the casing by means of a pin 16. An arched slide valve 21 is pivotally connected by arms 19 with a support 20 positioned in the centre of curvature of said valve so that said valve pivots around said support 20. Valve 21 and arms 19 are connected with vane 32 by means of a lever 18 and a connecting rod 17. A counterweight 22 counteracts the wind pressure on vane 32 and tends to move the slide valve and the vane into the "open" position represented in the figure. The space 24 below vane 32 is vented by means of one or more openings 25 through one or more ducts 26, debouching at 27 into the air duct 23. It is easy to see that the resultant of air pressures acting on the slide valve 21 will always go through the pivot 20 so that the position of said valve will not be influenced by said forces.

The embodiment shown in Figure 3 is particularly suitable for ventilation of motor vehicles, due to its small size and the simplicity and ruggedness of its design. The reference numeral 42 indicates a duct receiving ventilation air at the front end of the motorcar, reference numeral 43 indicates another duct discharging air into the car body. One of said ducts may be provided with a device to heat the ventilation air. The two ducts are connected with the apparatus according to the invention.

This comprises a drum-shaped casing 38, 44 provided with a member 46 pivotally mounted on a pin 34 and comprising an arched slide valve 45 and a vane 33 which under the influence of wind pressure will more or less rotate the member 46 around its pin 34, modifying thereby the area of the throughflow 48 to duct 43. A curved guide vane 35, positioned between the side-plates of member 46, directs a part of the air stream more directly against vane 33 to increase the wind pressure acting thereupon. The counteracting couple is provided by a helical spring 36, one end of which is fastened to pin 34, the other one being hooked onto the rim of guide vane 35. This spring tends to rotate the member 46 into the position represented in the drawing, in which position the vane 33 abuts against a stop 51 and the passage 52 is entirely free. The vane 33 is provided with an arched part 37 partially surrounding the pin 34 and a partition 49 prolonging the ducts 42 extends nearly up to said arched part 37, leaving but a small clearance between them. Only a small clearance is equally provided between the side-plates of the pivotally movable member 46 and the side-walls of the casing.

As a result of this arrangement only a small quantity of air can penetrate into the space 50 behind vane 33. This space is vented moreover by means of one or more ducts having their intake at 39 and debouching at 41 behind the inlet 52 of duct 43, so that no undesirable back-pressure on vane 33 can build up in space 50.

Other embodiments of my invention as well as modifications of the embodiments described heretofore may present themselves to the mind of a person skilled in the art without departing from the scope of my present invention.

I claim:

1. An automatically controlled ventilation device comprising a box-like casing having an air intake orifice and an air outlet orifice and having a passageway therethrough, the wall of said passageway being curved outwardly to define a pocket therein, said passageway connecting said inlet orifice with said outlet orifice, a damper plate in said passageway between said pocket and said air outlet orifice adapted to obstruct said passageway to a varying degree, guide means on said casing guiding movement of said damper plate in substantially its own plane, bias means to bias said damper plate towards its least obstructive position with a force which increases as said damper plate moves away from said least obstructive position, and means responsive to an air stream impact connected to the damper plate to actuate said damper plate comprising a vane positioned across said pocket substantially separating said pocket from said passageway and movable in said pocket towards the bottom thereof under the impact of the air stream through said passageway, connecting means connecting said vane to said damper plate, and vent means in said pocket to relieve counterpressure acting on the pocket side of said vane in opposition to the pressure acting on the passageway side of said vane caused by the impact of the air.

2. An automatically controlled ventilation device as claimed in claim 1, the vent means comprising a duct connecting said pocket with said passageway downstream of said damper plate.

3. An automatically controlled ventilation device comprising a box-like casing having an air intake orifice and an air outlet orifice and having a passageway therethrough, the wall of said passageway being curved outwardly to define a U-shaped pocket, said passageway connecting said inlet orifice with said outlet orifice, a damper plate in said passageway between said pocket and said air outlet orifice adapted to obstruct said passageway to a varying degree, guide means guiding movement of said damper plate substantially in its own plane, bias means to bias said damper plate towards its least obstructive position with a force which increases as said damper plate moves away from said least obstructive position, a vane positioned across and forming a part of the passageway wall adjacent the top of said U-shaped pocket and movable within said pocket, substantially separating said pocket from said passageway, connecting means connecting said vane to said damper plate to actuate said damper plate, and vent means in said pocket to maintain a pressure differential on said vane to permit said vane to move deeper into said pocket under the impact of air passing through said passageway.

4. An automatically controlled ventilation device as claimed in claim 3 in which said damper plate comprises a flat plate having an aperture therein and having the top portion thereof bent over, said connecting means comprising a connecting piece connecting said vane and said flat plate, said bent over top portion and said connecting piece having a plurality of aligned holes therein, said guide means comprising a plurality of vertically positioned spaced wires extending through said holes, whereby said damper plate is slidably mounted for movement perpendicular to said passageway, and said bias means comprises a spring urging said damper plate to its least obstructive position.

5. An automatically controlled ventilation device as claimed in claim 3 in which said vane is pivotally mounted across the top of said U-shaped pocket, and said damper plate comprises a curved slide valve adapted to swing across said passageway having a pair of arms pivotally connecting said valve to said casing, said bias means comprises a counterweight positioned on an extension of said arms to normally keep said slide valve in its least obstructive position, a pair of crank arms attached to said arms at said pivotal connection and a pair of connecting links connecting said slide valve to said vane.

6. An automatically controlled ventilation device comprising a substantially drum-shaped casing having a cylindrical wall and two end walls and having an air inlet orifice and an air outlet orifice circumferentially spaced by an upper and a lower section of said cylindrical wall, a curved damper plate pivotally mounted at the axis of said cylindrical casing adapted to obstruct said outlet orifice in juxtaposition with said upper wall section at its least obstructive position, bias means to bias said damper plate towards its least obstructive position with a force increasing as said plate moves away from said least obstructive position, a vane rigidly connected to said damper plate depending vertically from the axis of said cylindrical casing, a small clearance being provided between the edges of said vane and said casing, a partition in said casing extending inwardly from the lower edge of the intake orifice to a point adjacent the axis of said casing, said partition, side walls and lower cylindrical wall section of the casing forming a pocket, vent means for said pocket, and deflecting means adjacent the axis of said casing to deflect incoming air onto said vane.

7. An automatically controlled ventilation device as claimed in claim 6 including an axle within said casing, two side plates pivotally mounted thereon with a small clearance between them and the side walls of said casing, said damper plate and said vane being mounted on said side plates, said deflecting means comprising an arcuate deflector extending between said side plates and fixed thereto to direct a part of air flowing through said casing against the vane, and said bias means comprising a helical spring attached to said axle bearing against said deflector, thereby urging said damper plate to its open position.

8. An automatically controlled ventilation device as claimed in claim 6 in which said vane extends into said casing past the edge of the partition adjacent the axis of said casing, the part of the vane opposite said edge of the partition being arcuate in shape with the center corresponding to the axis of the casing, the convex face of said arcuate part facing the said edge of said partition, a small clearance being left between the arcuate portion of said vane and the edge of the partition in all positions of the vane.

References Cited in the file of this patent

UNITED STATES PATENTS

| 570,284 | Humphreys | Oct. 27, 1896 |
| 635,828 | Weston et al. | Oct. 31, 1899 |
| 1,499,978 | Gilmore | July 1, 1924 |
| 1,708,310 | Korngiebel | Apr. 9, 1929 |
| 2,584,418 | Branson | Feb. 5, 1952 |

FOREIGN PATENTS

| 302,264 | Italy | Oct. 22, 1932 |
| 557,988 | Great Britain | Dec. 14, 1943 |